United States Patent [19]

Feeney et al.

[11] Patent Number: 4,876,102

[45] Date of Patent: Oct. 24, 1989

[54] POTATO BASED DOUGH CONTAINING HIGHLY PECTINATED CELLULOSIC FIBERS

[75] Inventors: Robert D. Feeney, Hawthorne, N.J.; Robert L. Prosise; Joseph McGrady, both of Cincinnati, Ohio; Raymond L. Niehoff, West Chester, Ohio

[73] Assignee: The Procter & Gamble Company, Cincinnati, Ohio

[21] Appl. No.: 139,527

[22] Filed: Dec. 30, 1987

[51] Int. Cl.$^4$ .............................................. A23L 1/217
[52] U.S. Cl. .................................... 426/550; 426/439; 426/637; 426/808
[58] Field of Search ................ 426/550, 439, 808, 637

[56] References Cited

U.S. PATENT DOCUMENTS

| | | |
|---|---|---|
| 2,865,757 | 12/1958 | Aurell . |
| 2,938,796 | 5/1960 | Zick . |
| 3,027,258 | 3/1962 | Markakis et al. . |
| 3,085,020 | 4/1963 | Backinger et al. . |
| 3,574,634 | 4/1971 | Singer . |
| 3,821,449 | 6/1974 | Swisher . |
| 3,982,003 | 9/1976 | Mitchell et al. . |
| 3,992,554 | 7/1975 | Blake et al. . |
| 3,998,975 | 12/1976 | Liepa . |
| 4,143,172 | 3/1979 | Mitchell et al. . |
| 4,167,588 | 9/1979 | Willard . |
| 4,219,575 | 8/1980 | Saunders . |
| 4,225,628 | 9/1980 | Lynn . |
| 4,275,088 | 6/1981 | Hart et al. . |
| 4,379,782 | 4/1983 | Staub . |
| 4,431,681 | 2/1984 | Hegedus et al. . |
| 4,451,489 | 5/1984 | Beale . |
| 4,451,490 | 5/1984 | Silverman et al. . |
| 4,497,838 | 2/1985 | Bonnell . |
| 4,503,083 | 3/1985 | Glicksman et al. . |
| 4,517,204 | 5/1985 | Mottur et al. . |
| 4,526,794 | 7/1985 | Altomare et al. . |
| 4,526,799 | 7/1985 | Glicksman et al. . |

FOREIGN PATENT DOCUMENTS

| | | |
|---|---|---|
| 3403090 | 8/1984 | Fed. Rep. of Germany . |
| 54573 | 4/1982 | Japan . |
| 2144759A | 3/1985 | United Kingdom . |
| 2145103A | 3/1985 | United Kingdom . |

*Primary Examiner*—Donald E. Czaja
*Assistant Examiner*—Mary S. Mims
*Attorney, Agent, or Firm*—Karen F. Clark; Gary M. Sutter; Richard C. Witte

[57] ABSTRACT

Improved fried food potato-based products are formulated by the addition of certain water absorbent cellulosic fibers (hereinafter "fibrous cellulosic material"), preferably those high in pectin (hereinafter "cellulosic absorbent material"), most preferably Modified Citrus Absorbent Material (hereinafter "MCAM") or sugar beet pulp absorbent material (hereinafter "SAM") to the dough thereof to achieve increased workability of said dough after mixing and storage, and enhanced texture and flavor of said fried foods after frying. In addition, increased retention of crispness after the microwave reheating thereof in a fry-freeze-microwave cycle is accomplished. Most preferred fiber source is the highly pectinated cellulosic fiber MCAM, derived from citrus albedo, and is added to the potato-based dough in an amount approximately equal to 6% by weight.

22 Claims, No Drawings

POTATO BASED DOUGH CONTAINING HIGHLY PECTINATED CELLULOSIC FIBERS

FIELD OF THE INVENTION

The field of this invention is improved fried potato products made from dehydrated potato dough to which water-absorbent cellulosic fibers have been added.

BACKGROUND OF THE INVENTION

This invention relates to fried food products made from potato dough to which certain water absorbent fibers (hereinafter "fibrous cellulosic material"), preferably highly pectinated cellulosic material (hereinafter "cellulosic absorbent material"), most preferably modified citrus absorbent material (hereinafter "MCAM") or sugar beet pulp absorbent material (hereinafter "SAM"), has been added. While citrus fruits are primary sources of high pectin containing cellulosic fibers, other food sources such as apples, apricots, and watermelon rinds are also high in pectin and can also be employed as sources of fiber in the present invention. Although the preferred embodiments of this invention incorporate fibrous cellulosic material high in pectin content, certain other sources of fibrous cellulosic material also may be used successfully and will be disclosed herein.

Several references disclose that the addition of citrus fiber to various food compositions results in certain improvements. For example, U.S. Pat. No. 3,821,449 of Swisher (assigned to Sunkist Growers Inc.), issued June 28, 1974, discloses that the addition of raw fresh citrus peel to cakes yields a natural "bite" feeling in the mouth. Initially, the raw fresh citrus peel is immersed in hot vegetable oil under atmospheric pressure in order to dehydrate the peel. Next, the peel is further dehydrated by vacuum until the peel has a moisture content of 15 percent or less. Finally, the peel material is separated from the oil and then drained.

Similarly, U.S. Pat. No. 3,574,634 to Singer (assigned to Calogics), issued Apr. 13, 1971, and U.S. Pat. No. 4,379,732 to Staub (assigned to General Foods), issued Apr. 12, 1983, disclose the addition of cellulosic materials, such as citrus albedo, in addition to pineapple core bulking agent and sugar beet pulp bulking agent to create low calorie food products such as spaghetti, macaroni, and related pasta products. Also, the inclusion of this fiber in low calorie food compositions high in polysaccharides or polyols is said to alleviate the diarrhea often resulting from ingestion of low calorie food products high in polysaccharides or polyols.

The prior art does not disclose the addition of citrus fiber or other cellulosic fibers to potato-based dough used in the manufacture of fried foods. However, U.S. Pat. No. 4,219,575 to Saunders et al. (assigned to Amfac Foods, Inc.), issued Aug. 26, 1980, discusses a process for preparing frozen french fried potatoes in order to increase the crispness of finished french fries after microwave reheating. The french fries have an undulating side surface configuration of particular dimensions which is specifically adapted for microwave reheating. In order to increase the crispness of the finished french fries, modified food starch may be added.

It is therefore an object of this invention to create improved fried food products made from a potato-based dough, wherein said dough and the food products made therefrom are improved by the addition of a fibrous cellulosic material, said material having a high water absorbency. The source of the fibrous cellulosic material for use in this invention is preferably high in pectin (i.e., it contains at least 15% pectin), and most preferably citrus peel fiber or sugar beet pulp. However, certain other sources of fibrous cellulosic material can be utilized to achieve a cellulosic material having the requisite water absorbency and can be satisfactorily utilized in the invention disclosed herein.

It is another object of this invention to create a potato-based dough which exhibits improved workability or pliability after said dough is mixed and stored, due to the "conditioning" which said dough undergoes as a result of the addition of said cellulosic fibrous material.

It is a further object of this invention to create a fried food product with enhanced flavor and texture after frying.

It is an additional object of this invention to create a fried food product which retains its crispness after microwave reheating in a fry-freeze-microwave cycle.

It is also an object of this invention to create a "dichotomous" fried food product using two separate layers of dough, the outer with added fibrous cellulosic material and the inner without added fibrous cellulosic material, arranged in a coaxial tub-cylinder geometry. Said "dichotomous" fried food product exhibits a newly perceived dual texture wherein the outer dough is crispy and the inner dough is softer.

These and other objects of the invention will become clear by the disclosure herein.

All percentages and ratios are by weight unless otherwise indicated.

SUMMARY OF THE INVENTION

An improved potato-based dough is disclosed for use in the manufacture of potato-based fried foods. Said improvements are achieved by the addition of water absorbent fibrous cellulosic material, preferably that which is highly pectinated cellulosic material (hereinafter "cellulosic absorbent material"). Most preferred fibrous cellulosic materials are citrus peel fiber in the form of modified citrus absorbent material (MCAM), or sugar beet pulp absorbent material (SAM), most preferably MCAM derived from citrus albedo. Particularly, cellulosic absorbent material is derived from sources of fiber high in pectin and has been modified to increase its oil and water-absorbing capacity. When cellulosic absorbent material is used as the absorbent fibrous cellulosic material, it is added to potato-based dough in the amount of from about 3% to about 20%, preferably from about 3% to about 9%, and most preferably in the amount of about 6%.

Certain other fibrous cellulosic materials have been found suitable for use in this invention, not because they are high in pectin, but because they consist of a water-soluble fibrous component and a water-insoluble fibrous component. This type of fiber is prepared by mixing the water-soluble fibrous component and the water-insoluble fibrous component to achieve a fibrous cellulosic material that is also added to the potato-based dough. When this type of fibrous cellulosic material is utilized, however, it is added to the dough in the amount of from about 3% to about 20%, preferably in the amount of about 6% to about 12%. The two components interact with one another to give the potato-based dough increased pliability and extensibility. The water-soluble fibrous component should preferably consist of xanthan, carageenan, guar, carboxy-methyl cellulose, or any mixture thereof, but other water-soluble fibrous components such as pectin, gum tragacanth, locust bean gum, or any mixture thereof may also be used satisfactorily. The water-insoluble fibrous component may consist of any natural fiber that contains less than 1% soluble fiber, including, for example, oat fiber, pea fiber, soy fiber, oat bran, rice bran, or any mixture thereof. In addition, certain processed cellulosic fibers, such as Avicel® (FMC Corp., Philadelphia, PA) or Solka Floc® (James River Corp., Berlin, NH), may also be successfully used as the water-insoluble fibrous component.

The addition of fibrous cellulosic material to the potato-based dough results in a dough that is more workable, and produces a fried food product of increased crispness and texture which also retains its improved crispness upon being subjected to microwave reheating.

DETAILED DESCRIPTION OF THE INVENTION

The present invention relates to fried food products made from potato-based dough containing certain water absorbent fibrous cellulosic materials, preferably those which are high in pectin content (hereinafter "cellulosic absorbent material"), for example MCAM (modified citrus absorbent material) or SAM (sugar beet pulp absorbent material), most preferably MCAM made from citrus albedo, and the process for making same. By high in pectin content as used herein is meant that the pectin content of the fibrous cellulosic material is at least 15%, preferably from about 15% to about 60%. When the fibrous cellulosic material is chosen from a highly pectinated cellulosic absorbent material, it is added to the potato-based dough in an amount of from about 3% to about 20%, preferably from 3% to about 9%, most preferably about 6%. Certain other water absorbent fibrous cellulosic materials not exhibiting a high pectin content but consisting of a water-soluble component and a water-insoluble component may also be satisfactorily utilized. When the fibrous cellulosic material consists of a water-soluble component and a water-insoluble component, it is added to the potato-based dough in an amount of from about 3% to about 20%, preferably from about 6% to about 12%. Improved texture and structure formation, as well as increased oil/water retention, is exhibited by the addition of said fibrous cellulosic material to certain fried food formulations.

By "cellulosic fiber," as used herein, is meant a dietary fiber comprised of at least about 20% cellulose or modified cellulosic material. Sources of cellulosic fiber include vegetables, fruits, seeds, cereals, and man-made fibers (for example by bacterial synthesis).

The fibrous cellulosic material used in the practice of the present invention must have a water absorbency of between about 2 g water/g fiber and about 25 g water/g fiber, and preferably between about 8 g water/g fiber and about 20 g water/g fiber. High absorbency is preferred for providing the benefits of this invention. Because of this, various sources of the fibrous cellulosic material may be used. Certain fibrous cellulosic materials, because of a high pectin content, have the requisite water absorbency. On the other hand, other fiber sources, although not high in pectin, can be utilized due to the fact that they possess the requisite water absorbency because they consist of a water-soluble component and a water-insoluble component.

For purposes of this invention, absorbency is measured by the following procedure. A standard heat-sealed tea bag is used, made with tea bag filter paper, Dexter Grade 1234 Tea (C. H. Dexter Corp., Windsor Locks, CT), and measuring 3" by 2-7/16". One-half gram of fiber is placed into an empty tea bag. The bag is immersed for 2 minutes in distilled water at room temperature, then removed and suspended in the air, and allowed to drip dry for 10 minutes. The bag is then weighed. The procedure is repeated using an empty tea bag without fiber. The weight of the wet bag alone is subtracted from the weight of the wet bag containing fiber. This number is divided by the weight of the sample in order to obtain an absorbency value measured as grams water/grams fiber.

Because the water absorbency of the chosen fibrous cellulosic material is crucial to the workability of the present invention, preferred fibrous cellulosic materials are those cellulosic absorbent materials with a relatively high pectin content, since water absorbency is directly increased by increasing pectin content. It is for this reason that the chosen source of cellulosic fiber is preferably composed of from about 15% to about 60% pectin, and from about 15% to about 80% cellulose, in addition to various other fibrous components such as hemicelluloses and lignin. Most preferred ranges are from about 15% to about 50% pectin and from about 30% to about 60% cellulose.

Preferably, the fibrous cellulosic material is selected from high pectin containing sources such as whole citrus peel fiber or citrus albedo fiber or other naturally occurring fibers that contain a composition of pectin and cellulose similar to citrus peel fiber, for example sugar beets, dried citrus pulp, citrus rag, citrus juice vesicle solids, apples, apricots, and watermelon rinds or mixtures thereof. More preferred sources are citrus whole peel or sugar beet pulp, while most preferred is citrus albedo. Mixtures of the above can also be used. These fibers are obtained from their natural sources by processes known to the art and disclosed in the following U.S. patents, all incorporated by reference herein: U.S. Pat No. 2,147,521 to Bustamante (assigned to Florida Citrus Exchange), issued Feb. 14, 1939; U.S. Pat. No. 2,362,014 to Lissauer and Credo (assigned to Citrus Processes), issued Nov. 7, 1944; U.S. Pat. No. 3,821,449 to Swisher (assigned to Sunkist Growers), issued June 28, 1974; U.S. Pat. No. 3,982,003 to Mitchell et al. (assigned to Mars Limited), issued Sept. 21, 1976; U.S. Pat. No. 4,143,172 to Mitchell et al. (assigned to Mars Limited), issued Mar. 6, 1979; U.S. Pat. No. 4,225,628 to Lynn (assigned to Ben Hill Griffin), issued Sept. 30, 1980; U.S. Pat. No. 4,379,782 to Staub et al. (assigned to general Foods), issued Apr. 12, 1983; U.S. Pat. No. 4,497,838 to Bonnell (assigned to Tropicana Products), issued Feb. 5, 1985; U.S. Pat. No. 4,526,794 to Altomare et al. (assigned to General Foods), issued July, 2, 1985.

MCAM can be made from the entire peel of citrus fruit (hereinafter referred to as "whole peel MCAM"), or from only the albedo portion of the peel, the whitish inner portion of the rind, (hereinafter referred to as "albedo MCAM"). Both whole peel MCAM and albedo MCAM typically contain on the order of about 40% pectin and about 27% cellulose by weight. Citrus whole peel, however, unlike citrus albedo, contains, in addition, lignin, another fibrous cellulosic component.

SAM is made from sugar beet pulp, a waste product of the sugar industry. SAM typically contains from about 15 to about 20% pectin, about 25 to about 30% cellulose, and about 15% hemicellulose.

"Pectin" is defined as the portion of the fiber which is capable of forming methyl esters or binding metals, calculated as polygalacturonic acid. The underlying assumptions are that the pectin does not contain any free acid groups, that all of the pectin is anhydrogalacturonic acid, and that no insoluble alkaline earth metal salts, other than calcium salts, are present. These assumptions have been verified by independent methods to be correct within a reasonable margin of confidence.

The sum of cellulose and hemicellulose is taken to be the total of neutral sugars left in the sample after extractions with an organic solvent, such as ethanol. Cellulose may be determined separately as the total amount of fructose. The balance of neutral sugars is hemicellulose.

It has been discovered that the pectin in the composition of these fiber sources plays an important part in determining the absorbent properties of the material. Although compositions differ among species and within species, more than 60% of the pectin in vegetable material is in the form of the methyl ester. In the case of orange peels, on the order of 20% is present as the calcium salt; the balance is generally in the protonated form, or an alkali metal salt, mostly potassium. The pectin in the cellulosic absorbent materials of the present invention has a degree of esterification of less than 45%. The cellulosic starting material must therefore be subjected to a deesterification step which preferably may be accomplished by alkaline treatment at a pH of from about 8 to about 13, preferably 9.5, for a period of up to 120 minutes. The deesterification process may also be attained by use of an enzyme such as pectin-esterase, an enzyme naturally present in citrus peel.

When these pectin-containing fiber sources are used as the fibrous cellulosic materials, care should be taken that the amount of divalent metal pectates is not substantially increased. In particular, calcium pectates have been found to be detrimental to the absorption properties of the material. Moreover, the calcium pectates once formed cannot be readily converted to other pectic materials like alkali metal salts or pectic acids. In general, the total equivalent percent of divalent metals must be less than 50%. The equivalent percent of calcium is preferably less than 30%. In practical terms this means that calcium hydroxide or calcium carbonate cannot be used for alkaline deesterification. For this reason, it is advisable to use deionized or distilled water when processing the pectin-containing cellulosic absorbent material. However, tap water has been found to not significantly reduce the absorbent properties of the materials, provided the water hardness does not exceed about 7 grains/gallon (corresponding to about 120 ppm $CaCO_3$) and provided that no excessive amounts of water are used. The term "soft water" as used herein therefore refers to water having a hardness of less than 7 grains/gallon (less than about 120 ppm $CaCO_3$).

Particularly when citrus waste is used, the highly pectinated fibrous source material may contain complex mixtures of lipids and lipid-like materials, and other non-polymeric organic materials. The absorbent properties of the resulting absorbent material may be greatly enhanced by removing these organic extractable materials. In addition, the removal of these organic extractable materials may render a final product with improved aesthetic properties, free of undesirable color or aroma. If desired, these materials may be satisfactorily removed with an organic solvent, most preferably with ethanol.

Hence, the present invention preferably relates to a potato-based fried food product containing cellulosic absorbent materials comprising (a) from about 15% to about 60% pectin, said pectin having a degree of esterification of from about 1% to about 45%, and less than about 50% of the pectin being in the form of a divalent metal salt; (b) from about 15% to about 80% of a material selected from the group consisting of cellulose, hemicellulose, lignin and mixtures thereof; (c) from 0% to about 1% organic solvent-soluble lipids, extractable with an organic solvent such as ethanol; (d) from 0% to about 10% non-lipid organic materials extractable in an organic solvent, such as ethanol; and (e) from 0% to about 6% water-soluble metal salts.

The second major component of the high-pectin containing cellulosic absorbent material, next to pectin, is the cellulosic component. The balance of the fibrous cellulosic material consists of hemicellulose and lignin. The actual composition of the high pectin containing fibrous cellulosic material is to a large extent determined by the choice of the raw material source of the fibers, and to a lesser extent by the process of obtaining the fibers from the source. For example, hemicellulose is likely to be partially removed during processing, which increases the relative amounts of cellulose and lignin in the mixture. Depending on the raw material source, the amount of lignin may be very small. For example, citrus whole peel has a much greater amount of lignin than citrus albedo, while, in general, citrus waste has a much lower lignin level than beet pulp. Despite this difference, however, excellent water absorbent fibrous cellulosic materials can be prepared from either source.

It has been discovered that divalent metal pectates, in particular calcium pectates, are far inferior to alkali metal pectates (e.g. sodium pectates) with regard to absorbent properties. This is probably due to the fact that divalent metal salts of pectin are "cross-linked", whereby the divalent metal ion serves as the link between two adjacent pectin molecules. This cross-linking is believed to prevent swelling of the pectin and to thereby reduce its absorbency. Some of the pectin is naturally present as the calcium salt. Care must be taken not to increase the amount of calcium pectate any further. Therefore, during processing, the materials should not be exposed to excessive amounts of calcium. If calcium is present in the form of an insoluble mineral salt which is not capable of interacting with the esterified pectin, the presence of calcium is probably not harmful at all.

One specific embodiment of this invention utilizes a citrus peel-derived high pectin-containing cellulosic absorbent materials comprising: (a) from about 15% to about 60% pectin, said pectin having a degree of esterification of less than about 20%, and less than about 30% of the pectin being in the form of a divalent metal salt; (b) from about 30% to about 60% of a mixture of cellulose and hemicellulose; (c) from 0% to about 1% organic solvent-soluble lipids, extractable with an organic solvent such as ethanol; (d) from 0% to about 10% non-lipid organic materials, extractable in an organic solvent such as ethanol; and (e) from 0% to about 6% water-soluble metal salts. Preferably, the peels of ripe oranges or grapefruits are used as a starting material and the process is carried out in such a way as to avoid the excessive removal of hemicellulose, which occurs if the pectin undergoes acid deesterification, or if during deesterification the pH is allowed to remain excessively high.

In a second specific embodiment of this invention the high pectin-containing cellulosic absorbent material used in the potato-based fried food products is sugar beet-derived absorbent material comprising: (a) from about 15% to about 35% pectin, said pectin having a degree of esterification of less than about 45% (preferably less than about 20%), and less than about 30% of the pectin being in the form of a divalent metal salt; (b) from about 20% to about 80% of a mixture of cellulose and hemicellulose; (c) from 0% to about 1% organic solvent-soluble lipids, extractable in an organic solvent such as ethanol; (d) from 0% to about 10% non-lipid organic materials, extractable in an organic solvent such as ethanol; and (e) from 0% to about 6% water-soluble metal salts.

The process for preparing the cellulosic absorbent materials from the pectin-containing source material depends to a large extent on the source material being used. The process is aimed at reducing the degree of esterification of the pectin in the material, and removing excessive amounts of extractable materials. The process therefore comprises the steps of (a) comminuting a pectin-containing vegetable material to a particle size of from about 0.05 mm to about 3 mm; (b) deesterifying the pectin to a degree of esterification of less than about 45%; (c) washing the vegetable material in soft water; and (d) drying the vegetable material to a moisture content of less than about 15%.

The manner in which the deesterification of pectin may be carried out is not critical and may, for example, be enzymatic or chemical. Chemical deesterification of pectin may be carried out at acid or alkaline pH. Acid deesterification is not preferred as it is slow and leads to both divalent ion extraction and hemicellulose degradation. Alkaline deesterification is preferred but care must be exercised. Pectin methyl ester can degrade via a beta-elimination mechanism, so pH and temperature should be carefully controlled. Enzymatic deesterification may be carried out with the enzyme pectinesterase; this is particularly convenient when citrus peels are used as starting material because the enzyme pectinesterase is naturally present in citrus peels. Alternatively, deesterification may be carried out by soaking the vegetable material particles in a solution of an alkali metal hydroxide. The reaction rate increases with the concentration of hydroxyl ions, therefore, the higher the pH, the faster the reaction will be. The pH should therefore be above about 8, preferably above about 9. Excessively high pH values tend to result in removal of hemicellulose and other desirable materials. Therefore, the pH should not exceed about 13, and should preferably be below about 12. While a degree of esterification of less than 45% is generally achieved after about 2 minutes at pH 9.5 or greater, it is generally desirable to maintain the pH at 9.5 for 20 minutes to insure satisfactory results. As beta-elimination is very temperature dependent, a temperature of about 25° C. or lower is preferred. Prolonged contacting of the vegetable material with the alkali hydroxide solution results in a progressively lower degree of esterification of the pectin. It is generally not necessary to continue this deesterification step for more than about 2 hours, since little additional benefit is obtained by doing so.

When the source of the fibrous cellulosic material is a pectin-containing fiber, the washing of the material is critical since it is necessary to remove the alkaline material and excess soluble materials. Washing may be done with water or with an organic solvent such as ethanol. The latter has the advantage that organic solvent-soluble lipids which may be present in the material are generally to some extent removed by an organic solvent like ethanol, but not by a water wash. The washing step may be conveniently carried out as follows. Excess liquid is drained off from the reaction mixture of the deesterification step. Then, enough of the washing liquid (i.e. water or an organic solvent such as ethanol) is added in order to obtain a slurry with a solids content of about 2%. The slurry is equilibrated for about 5 to 15 minutes, and then the washing liquid is drained off. This washing step may be repeated. The number of washing steps is determined by the amount of contaminants in the starting material and the desired composition of the finished absorbent material. Typically, 2 or 3 washing steps will be necessary.

After excess washing liquid has been drained off after the last washing step, the liquid content of the remaining material is on the order of about 90%. This must be reduced to less than about 20% in order to obtain a cellulosic absorbent material with optimum absorption properties. If an organic solvent such as ethanol is used in the washing step, said solvent may be simply removed by evaporating it. The material may also be dried by solvent displacement: after the last washing step with water, the material is slurried up with an organic solvent and the solvent is than drained off and the excess is evaporated.

For economic reasons it may not be feasible to use any organic solvents in the process. In that case, water will have to be removed using a conventional drying technique. This may be either freeze drying, vacuum drying, or thermal drying. Of these three, freeze drying is the most desired method because it does not cause collapse of the fine capillaries which are naturally present in the material. Unfortunately, freeze drying is also the most expensive drying method of these three.

Thermal drying is economically the most attractive method of drying available. If the 90% moisture product from the washing step is dried in an oven, a board-like material is obtained which is not very absorbent. It has been discovered, however, that the material may be dried by spraying it into a countercurrent of superheated steam or heated air. The inlet temperature and the flow rate should be controlled as to result in an outlet temperature in the range of from about 60° C. to about 75° C. This results in a product which has a moisture content of less than 15%. Although thermally dried materials possess good absorption capacities, the absorption kinetics of such materials tend to be slow. The rate of absorption can be vastly improved by adding a surfactant to the slurry during the last washing step. An amount of surfactant of from about 1% to about 3% by weight of the amount of the slurry is generally sufficient. The type of surfactant is not critical. Examples of suitable surfactants are nonionic surfactants, e.g. ethoxylated fatty alcohols.

Depending upon the desired nature and appearance of the final food product to which the pectin-containing cellulosic absorbent material is added, bleaching said material may be desired. However, the effect of bleaching is two-fold. It removes color materials, thereby vastly improving the appearance of the absorbent material obtained, and making said material more suitable for use in consumer products where a darkened appearance is not acceptable. Bleaching further tends to decompose organic solvent-soluble lipids into water-soluble fragments. Consequently, the bleaching step significantly reduces the level of organic solvent-soluble materials in the finished product.

The removal of organic solvent-soluble lipids is particularly important when citrus peels are used as the starting material. Citrus peels contain high levels of such organic solvent-soluble lipids and if water (as opposed to an organic solvent such as ethanol) is used in the washing steps of the process, bleaching is instrumental in reducing the level of organic solvent-soluble lipids to the desired level.

Should a bleaching step be desired, the bleaching is preferably performed with the addition of an oxidative bleaching agent. For optimum properties of the cellulosic absorbent material, and optimum safety of absorbent products made therewith, excess bleach and electrolytes introduced during the bleaching step must be removed by washing steps and food grade bleaching agents must be used. Therefore, hydrogen peroxide is a preferred bleaching agent. Bleaching may be carried out prior to the initial washing steps, or additional washing steps may be performed subsequent to the bleaching. Since color compounds may be formed during alkaline deesterification, the bleaching step is best carried out subsequent to the deesterification step if alkaline deesterification is used. In order to improve the effective use of the bleaching agent, it is desirable to include a washing step subsequent to the deesterification step and prior to the bleaching step, especially when citrus peels are used as the source material.

Although whole citrus peel may be used as the starting material, the flavedo part greatly increases the load of organic solvent-soluble lipids and colored materials. It is therefore most desirable to remove the flavedo part of the peel. The flavedo may be shaved off mechanically by machinery which is commercially available and designed for this purpose. Such equipment typically leaves about 30% of the flavedo on the albedo. It has been discovered that when these machine shaved peels are subjected to the process described hereinabove, an absorbent material is obtained which is negligibly less absorbent than the material obtained from a (hand-shaved) all-albedo starting material. Whole citrus peels may also be used as starting material. Highly acceptable cellulosic absorbent materials may be made therefrom, albeit at the expense of a higher usage of bleaching chemicals should removal of the increased amount of organic solvent-soluble lipids and colored materials be desired.

Sugar beets, by their nature, contain only low levels of organic solvent-soluble lipids. When processing sugar beet pulp, one may therefore forego the bleaching step if absorbent properties are the only concern. However, during alkaline deesterification, beet pulp develops a persistent green color and a bleaching step may be highly desirable or even necessary from an aesthetics viewpoint.

The processing of other pectin-containing raw materials will have become apparent from the foregoing. The bleaching step may be foregone if the starting material has a low organic solvent-soluble lipid content, contains little colored materials, or if the aesthetics of the absorbent material are relatively unimportant (e.g. when intended for industrial use). The choice of the method of deesterification (enzymatic or alkaline treatment) is largely determined by economic determinations: enzymatic deesterification is relatively slow while alkaline treatment is faster and lends itself better to a continuous operation of the process. The choice of the washing liquid (water or an organic solvent such as ethanol) is likewise determined by economic considerations with which a person skilled in chemical engineering may be deemed well familiar.

While high-pectin containing fibers are preferred, sources of fibrous cellulosic materials for use in the preparation of the improved potato-based dough of the present invention, certain other fiber sources can also be satisfactorily employed as the fibrous cellulosic material therein because, due to the fact that they are comprised of both a water-soluble component and a water-insoluble component, they too have the requisite water absorbency that renders them suitable for use in the potato-based dough as well. Since this type of fibrous cellulosic material consists of two separate and distinct fibrous components, one water-soluble and one water-insoluble, the interaction of these two components with each other renders the dough to which they are added more workable and pliable.

This particular fibrous cellulosic material is prepared by mixing a water-soluble fibrous component with a water-insoluble fibrous component. The water-soluble fibrous component serves to increase the extensibility of the potato-based fiber dough, a function of the dough's viscoelastic and plastic properties. In addition, the water-soluble fibrous component allows the dough to trap and hold an increased amount of air during mixing which results in increased expansion of the dough during frying. Finally, the water-soluble fibrous component stabilizes the air/aqueous interface during the mixing and frying of the dough while maintaining a series of finely dispersed entrained air bubbles in the dough which form an expanded cellular structure upon frying. This expansion is greatest when the water-soluble fibrous components, and mixtures thereof, that form liquid crystals are used; the liquid crystal-forming water-soluble components are, therefore, the preferred water-soluble fibrous components. Among the liquid crystal forming water-soluble fibrous components are xanthan, carageenan, guar, and carboxy-methyl cellulose. Other water-soluble components, for example pectin, gum tragacanth, locust bean gum, and mixtures thereof, also can be used satisfactorily.

The water-insoluble fibrous component provides solid dispersed particles which provide a physical strengthening of the dough structure. In addition, the water-insoluble component aids in expanding the dough structure by increasing the viscosity of the dough by allowing more air to be entrained therein. Finally, the water-insoluble component aids the water-soluble component in cellular expansion by stabilizing the air/aqueous interface of the air bubbles. Water-insoluble fibrous components include natural fibers that contain less than 1% soluble fiber. Preferred water-insoluble fibrous components consist of, but are not limited to, oat fiber, pea fiber, oat bran, and rice bran. However, certain processed cellulosic fibers such as Avicel® (FMC Corp., Philadelphia, PA) and Solka Floc® (James River Corp., Berlin, NH) may also be used successfully as water-insoluble fibrous components, providing the fiber's length/diameter (l/d) ratio is preferably less than about 10.

This type of fibrous cellulosic material is generally preferably prepared by dry mixing the water-soluble fibrous component with the water-insoluble fibrous component. The fibrous cellulosic material should contain approximately 0.5% to approximately 25% of the water-soluble fibrous component, with the remainder consisting of the water-insoluble fibrous component. It is sometimes desirable, however, to prehydrate the water-soluble fibrous component by adding all or part of the water of the dough mixture before combining with the water-insoluble component. The amount of water necessary to prehydrate the water-soluble component depends upon the particular fiber source being used and its respective ability to absorb water and is easily discernible by one skilled in the art.

Because the water-soluble and the water-insoluble components of the fibrous cellulosic material interact with one another in the potato-based fiber dough system, a synergistic effect exists when certain processed water-insoluble fibrous components that contain a certain level of their own water-soluble fiber are used. Examples of fibrous cellulosic materials that contain water-insoluble fibers are made up of a significant amount of an inherent water-soluble fiber are Dietfiber Soy Fiber ® (Lauhoff Green Co., Danville, IL), Fibrim Soy Fiber1000 ® (Protein Technology, St. Louis, MO), and Hi-Fi Lite Pea Fiber ® and Uptake 80 Pea Fiber ® (both from Woodstone Foods, Portage La-Prairie, Manitoba, Canada). When these water-insoluble fibrous components are used, their own inherent water-soluble fibrous portion joins the water-soluble component and yields a synergistic effect on increasing cellular expansion and structural strength of the fiber dough system, similar to that attained by adding the water-soluble fibrous component to the water-insoluble fibrous component to create the fibrous cellulosic material as previously described.

The fibrous cellulosic material should preferably also have a particle size such that at least about 80% of the fiber particles have a diameter less than about 300 microns, and more preferably less than about 200 microns. In addition, the length/diameter (l/d) ratio of the fibrous cellulosic material should preferably be less than about 10. Larger particles are detected as gritty during mastication and are objectionable. The larger particles are also more difficult to disperse in the product. The fiber should preferably also have a reasonably bland taste and color so as not to negatively influence the taste or appearance of the finished fried-food product.

In order to create fried food products with increased structure formation, oil/water retention, and texture modification, the fibrous cellulosic material is added to dough prepared by partially rehydrating dehydrated potatoes according to the method disclosed in U.S. Pat. No. 3,998,975 to Liepa (assigned to Procter & Gamble), and issued Dec. 21, 1976, incorporated herein by reference. Most preferably, the doughs utilized in the present invention are the specific doughs disclosed in said patent. Specifically, they are prepared by intimately admixing water with dehydrated cooked potatoes to form a coherent, workable dough comprising from about 25% to about 55% water by weight, said dehydrated cooked potatoes having a reducing sugar content of from 0% to about 5% by weight and an iodine index of from about 0.01 to about 6, said dough having a lipid content defined by the following relationship:

$$Y = AX^{0.40},$$

where Y is the lipid content of the dough in percent by weight of dehydrated potatoes, A has a value less than or equal to 2.70, and x is the dehydrated potato iodine index which ranges from about 0.01 to about 6. Although the flavor and textures which result from frying the doughs of the above-identified patented method are satisfactory, an improved flavor and texture, an increased workable rheology after mixing and short storage, and an increased retention of crispness after microwave reheating is achieved upon the addition of the fibrous cellulosic material to the above discussed dough composition.

The dehydrated cooked potatoes (hereinafter "dehydrated potatoes") used in the present invention can be in either flake, granular, or powdered form (potato flour). These dehydrated potato products are made by drying cooked mashed potatoes. Although the potato component of the potato-based dough of the present invention can be derived from either the flake, granular, or powdered form, the most preferred form of said component depends upon the type of food product to be made. For example, should extrusion of the potato-based dough be necessary in order to create the desired food product, most preferred are the flake or granular form because the cell walls of these forms of potato component are substantially intact. Likewise, potato components in the flour form are not preferred for use in dough which is to be extruded, as potato flour consists of ruptured potato cells which cannot satisfactorily withstand the extrusion process. See, for example, U.S. Pat. No. 3,396,036 to Liepa (assigned to Procter & Gamble), issued Aug. 6, 1968, incorporated herein by reference. However, if a rolling and cutting type method of forming the potato-based dough is to be used, either flakes, granules, or flour may be used. The flakes can be made according to a number of known processes including those discussed in U.S. Pat. Nos. 2,759,832 to Cording (assigned to United States of America, Secretary of Agriculture), issued Aug. 21, 1956; 2,780,552 to Willard (assigned to United States of America, Secretary of Agriculture), issued Feb. 5, 1957; and 2,787,553 to Cording (assigned to United States of America, Secretary of Agriculture), issued Apr. 2, 1957. The granules can also be made according to known processes, including those described in U.S. Pat. Nos. 2,490,431 to Greene et al. (assigned to Research Corp., New York, NY), issued Dec. 6, 1949, and 2,520,891 to Rivoche (assigned to Farmers Marketing and Supply Co., Ltd., London, England), issued Aug. 29, 1950. Potato flour is made by drum drying cooked mashed potatoes to a thin sheet which is then ground to a desired fineness.

Dehydrated potato flakes typically have a moisture content of about 7% by weight and have their potato cells substantially intact with a minimum of free starch. In addition, various stabilizers and preservatives are usually employed to improve the stability and texture of the flakes. For example, from about 150 to about 200 parts per million (p.p.m.) of sulfite is provided in the dry product. This is added to the wet mash usually as dry sodium sulfite and sodium bisulfite and protects the flakes from darkening during processing and subsequent storage. Antioxidants such as BHA (2 and 3 tert-butyl-4-hydroxy-anisole) and BHT (3,5-di-tert-butyl-4-hydroxytoluene) are added in amounts up to a total of about 10 p.p.m. to prevent oxidative deterioration. Citric acid is generally added in a quantity sufficient to give about 90 p.p.m. in the dried product to prevent discoloration caused by the presence of ferrous ions. Monoglycerides such as glycerol monopalmitate or glycerol monostearate are also added to the wet mash prior to drying in amounts ranging from about 0.4% to about 1% by weight to improve the texture of the reconstituted mash.

Dehydrated potatoes in granular form have a moisture content of about 6% by weight and are composed of substantially unicellular potato particles which have their cell walls intact and which are capable of passing through about a No. 60 to about a No. 80 U.S. Series sieve. The granules also have sulfite added to reduce darkening, the amount of sulfite in the finished product usually comprising between about 200–400 p.p.m. of sulfite in the form of sodium sulfite and sodium bisulfite. Antioxidants such as BHA and BHT are added in amounts not exceeding 10 p.p.m. of both to prevent oxidative deterioration.

Potato flour is made by drying cooked mashed potatoes to a moisture level of about 6% by weight and grinding the dry product to a given particle size, generally from about 70 to about 180 microns. Unlike the dehydrated potato flakes and granules described above, however, potato flour is comprised of substantially 100% ruptured potato cells.

Any of the above described forms of dehydrated potatoes (i.e., flakes, granules, or flour), with or without the additives, can be used in practicing this invention, especially if they meet the preferred free starch content requirement. Dehydrated potatoes having a reducing sugar content between 0% and about 5.0% by weight, preferably between about 0.4% and about 2.0% by weight, are preferred when making potato-chip type products to maintain the desired light color in the fried chips since an excessive reducing sugar content adversely increased the rate of browning of the chip product. While the reducing sugar content is dependent upon that of the potatoes which were employed to prepare the dehydrated potato products, the amount of reducing sugar in the dehydrated product can be increased by adding suitable amounts of reducing sugars such as glucose, maltose, lactose, and the like.

Any dehydrated potatoes prepared from high quality potatoes can be used in this invention including Kennebec, Russet, Burbank, Idaho Russet, and Sebago potatoes.

The lipid content of dehydrated potatoes is usually well below about 1%, but it can be increased (when desired to improve the physical properties of the dough) to any level above about 1% by the addition of a suitable amount of fatty substances such as, for example, mono-, di-, and tri-glycerides of fatty acids, such as monopalmitin, monostearate, monolein, dipalmitin, and tripalmitin, and partial fatty esters of glycols, such as propylene glycol monostearate and monobehenate. The lipid can be added to the dehydrated potatoes or it can be added to the water. It is important, however, that the lipid be uniformly dispersed in whichever component it is mixed.

The total moisture content of the dough can range from about 25% to about 55% by weight (including the moisture content of the dehydrated potatoes), and is preferably from about 35% to about 45%, the balance of the dough comprising dehydrated potatoes (which have been rehydrated by the water) and the fibrous cellulosic component of the present invention.

In preparing the above described doughs, the water is added to the dehydrated potato component to rehydrate it. Said water is preferably heated, but can be mixed in at room temperature. The water and dehydrated potatoes are uniformly mixed in, for example, a Hobart, vertical, planetary paddle mixer until the water is evenly dispersed throughout the dough and the potatoes have been uniformly rehydrated to the extent possible by the amount of water present.

The above described dough is prepared by first creating the potato component by a process mentioned above. Next, a mixture is prepared by mixing 20% to 50%, preferably about 37%, by weight of said potato component with about 25% to 55%, preferably 21%, by weight of warm tap water. After the potato component and water have been mixed using the above-described method, between about 3% and about 20% fibrous cellulosic material is mixed with the remaining warm tap water and the resulting mixture is combined with the potato component and water mixture to make a dough. If the chosen fibrous cellulosic material is a highly pectinated cellulosic absorbent material, it is added to the potato-based dough in an amount from about 3% to about 20%, preferably from 3% to about 9%, most preferably about 6%. If the fibrous cellulosic material consists of a water-soluble component and a water-insoluble component, it is added to the potato-based dough in an amount of from about 3% to about 20%, preferably from about 6% to about 12%. The resulting dough mixture is mixed in a Simac 700 Pasta Mixer until it is uniform.

The addition of the fibrous cellulosic material to the dough causes a certain level of "conditioning" which allows the modified dough to retain a workable rheology after mixing and short storage. In the typical dehydrated potato dough, the hydration of the fiber immediately begins to stiffen the dough, reducing the time required for the working and extruding of the dough.

In addition, the use of the fibrous cellulosic material in potato dough formulations results in a wide range of new and enhanced textures. It is theorized that the water absorbent fibrous cellulosic material acts as an oil/water absorbing material in the dough and provides a steering force for the migration and holding of oil and/or water, resulting in the development of new textures. As a result of this property, increased crispness is exhibited in a fry-freeze-fry cycle.

A further advantage exhibited in fried foods made from potato dough to which a fibrous cellulosic material has been added is that such products retain enhanced crispness after a fry-freeze-microwave cycle. As explained above, the presence of fibrous cellulosic material prohibits water migration from the interior of the dough, preventing water equilibration near the surface, which allows the frying process to crisp the outer layers while the inner layers remain soft. During microwave treatment, this disequilibrium is maintained, allowing the crispy outer texture to persist.

After the above-describe dough has been prepared, it can be formed into suitable shapes which can be deep-fat fried to provide the potato products of the present invention. The sizes and shapes of the products into which the dough can be formed are endlessly variable. Potato chips, conventional french fries, and dichotomous french fries are among the particular potato products encompassed in the present invention.

conventional potato chips made from a slice of raw potato can be very closely simulated by passing the dough, made from either potato flakes, granules, or flour, prepared as described above, between spaced mill rolls to form a sheet of dough ranging in thickness from about 0.005 inch to about 0.1 inch, and preferably to about 0.007 inch to about 0.02 inch. The dough sheet so formed can be cut into elliptical pieces having the approximate size and shape of sliced potatoes and then fried in a conventional chip-frying apparatus. Alternatively, apparatus such as that described in U.S. Pat. No. 3,576,647 to Liepa (assigned to Procter & Gamble), issued Apr. 27, 1971 and incorporated by reference herein, can be used to produce uniformly-shaped chips.

In order to provide chips which have a surface conformation and shape similar to conventional chips made by frying thin slices of raw potatoes, it is preferred that the frying be performed with the chips constrained between a pair of closely fitting, similarly configured shaping molds which have apertures to permit the hot frying fat to come into intimate contact with the dough. Although the dough formulations herein described are particularly suited for preparing molded chips by constraining them during the frying operation, it is not necessary that the frying be performed with the dough in a constrained condition. Satisfactory chips or other potato products can be produced by freely passing cut dough pieces through hot frying fat.

The frying can be done in conventional triglyceride oils, or, if desired, the frying can be done in low calorie fat-like materials such as those described in U.S. Pat. Nos. 3,600,186 to Mattson et al. (assigned to Procter & Gamble), issued May 12, 1970; 4,005,195 to Jandacek (assigned to Procter & Gamble), issued Jan. 25, 1977; 4,005,196 to Jandacek et al. (assigned to Procter & Gamble), issued Jan. 25, 1977; 4,034,083 to Mattson (assigned to Procter & Gamble), issued July 5, 1977; and 4,241,054 to Volpenhein et al. (assigned to Procter & Gamble), issued Dec. 23, 1980, all incorporated by reference herein.

Exemplary of a noncaloric fat-like material for use as the frying medium is a mixture of hexa-, hepta-, and octa-esters of sucrose and medium- and long-chain fatty acids obtained from edible fats and oils and/or fatty acid sources that are generally recognized as safe or have been approved for direct food use by U.S. Food and Drug Administration regulations. Fatty acids with chain lengths of 8 to 22 carbon atoms can be used.

A preferred material of this type meets the following specifications:

(1) The total content of octa-, hepta-, and hexa-esters is not less than 95%.

(2) The content of the octa-ester is not less than 70%.

(3) The content of penta- and lower esters is not more than 3%.

(4) Free fatty acid is not more than 0.5%.

(5) Residual methyl esters of fatty acids is not more than 0.1%.

(6) The residue on ignition (sulfated ash) is not more than 0.5%.

(7) The free methanol residue is not more than 10 parts per million.

(8) Arsenic is not more than 1 part per million.

(9) Total heavy metal content (as Pb) is not more than 10 parts per million.

(10) Lead is not more than 2 parts per million.

(11) The viscosity is not less than 15 poise at 100° F. and 10 sec$^{-1}$.

(12) The liquid/solid stability is not less than 90% at 100° F.

The shortenings and oils used to prepare the fried food products typically can contain up to and including 75% by weight of the noncaloric fat-like material. These shortenings and oils are preferably supplemented with Vitamin E at a level of 1.0 mg d-alpha-tocopherol equivalents per gram of non-caloric fat-like material.

An example of a shortening made with the above-mentioned non-caloric fat-like material is as follows: 35% non-caloric fat-like material, 53% liquid triglyceride, 7% hardstock triglyceride, and 5% emulsifier. In particular, preferred non-caloric, fat-like materials of this type will contain not less than 70% of octa-esters. One non-caloric fat-like material of this type is comprised of 93.9% octa-ester, 6.1% hepta-ester, less than 0.1% tetra- and lower esters. The fatty acid composition of the non-caloric fat-like material of this example is 13.5% $C_{16}$ (palmitic acid), 41.7% $C_{18}$ (stearic acid), 39.3% $C_{18-1}$ (oleic acid and/or elaidic acid), 3.9% $C_{18-2}$ (linoleic acid), 0.0% $C_{18-3}$ (linolenic acid), 0.4% $C_{20}$ (eicosic acid), and 1.2% of other fatty acids not listed above.

A shortening could also be made with 75% of the above-mentioned non-caloric fat-like material and 25% cottonseed oil; where the fat-like material contains 85.2% octa-ester, 14.8% hepta-ester, less than 0.1% hexa-ester, less than 0.1% penta-ester, and less than 0.1% tetra- and lower esters; and where the fatty acid composition of the fat-like material is 10.7% $C_{16}$ (palmitic acid), 58.8% $C_{18}$ (stearic acid), 16.4% $C_{18-1}$ (oleic acid and/or elaidic acid), 11.8% $C_{18-2}$ (linoleic acid), 1.1% $C_{18-3}$ (linolenic acid), 0.5% $C_{20}$ (eicosic acid), and 0.7% other fatty acids not listed above.

The frying operation can be carried out with the frying fat at a temperature of from about 275° F. to about 400° F., but is preferably performed at a fat temperature of from about 315° F. to about 375° F. for a time of about 5 seconds to about 60 seconds, preferably from about 5 to about 30 seconds. Any edible cooking oil or shortening is a suitable medium for frying. The principal factor which influences the frying time is the color of the fried chip, which is primarily a function of the reducing sugar content of the dehydrated potatoes. Other factors which affect chip color are the presence of undesired color of the fibrous cellulosic material, the thickness of the chip, the temperature of the frying oil, and the type of oil used.

If, instead of preparing a potato chip-type product from the dough, it is desired to prepare a french fry-type potato product, the dough, as prepared above, is passed through a rigitoni die and extruded into rods ½ inch in diameter and 2 inches in length. As previously stated, if the potato-based dough is to be extruded, it is most favorable to use as the potato component that derived from the flakes or granules. These rods of dough are deep-fat fried in hot oil at 375° F. for 5 minutes. Additionally, said french fries can be fried, as can the chip-type products of this invention, in non-calorie fat-like materials disclosed in the art and incorporated herein. Said french fries are ready to eat and of improved crispness, quality, and texture. Additionally, if it is desired to prepare french fries for a fry-freeze-microwave cycle, the frying time of the dough rods must be reduced to 4 minutes. The fried dough rods may then be frozen and stored until ingestion by the consumer is desired. At that time, they are subjected to microwave heating until french fries of the desired crispness and texture are achieved.

Another modification of this invention relates to the use of two separate doughs, arranged in a coaxial tube-cylinder geometry, one containing a fibrous cellulosic material and one without said fibrous cellulosic material, to create a "dichotomous" french fry. By using the dough with the fibrous cellulosic component as the outer dough, crisp outer and softer inner texture was developed. This dual crisp-soft texture of this french fry is satisfactorily maintained after microwave heating.

EXAMPLE I

Preparation of Citrus Albedo

Modified Citrus Absorbent Material (MCAM)

2000 grams of citrus albedo is obtained by shaving the flavedo portion away from the citrus whole peel. The remaining albedo is then ground to a particle size of 200 microns upon being subjected to a hammermill and an urschel grinder with a 188 slot head. Next, the 2000 grams of albedo is washed in 16,000 grams of soft or distilled water in slurry form consisting of 2.5% albedo solids. The slurry is then deesterified upon being hydrolyzed by titration with 1N NaOH to pH 9.5. The solution is held at pH 9.5 for a period of 20 minutes by the addition of additional 1N NaOH when necessary. Next, the slurry is dewatered in a basket centrifuge and then washed with water while spinning in the centrifuge. The filter cake is bleached by being slurried with hydrogen peroxide in concentration of 2.0% solids, until a pH of 9.5 is obtained. The pH of 9.5 is maintained for 20 minutes by the addition of additional hydrogen peroxide. The bleached filter cake slurry is then dewatered in a basket centrifuge and then washed with water while spinning in the centrifuge. Finally, the bleached filter cake is dried. The resulting citrus albedo MCAM has a water absorbency of 10 g water/g fiber.

EXAMPLE II

Potato based dough is created by first mixing 37% by weight of potato flakes with 21% by weight of warm tap water in a Hobart, vertical planetary paddle mixer until the water is evenly dispersed throughout the dough and the potatoes have been uniformly rehydrated to the extent possible by the amount of water present. Next, 6% by weight of citrus albedo MCAM from Example I is mixed with 36% by weight warm tap water and added to the potato-water mixture. The resulting dough is mixed in a Simac 700 Past Mixer until it is uniform. Next, the dough is passed through a rigitoni die and extruded into rods ⅛ inch in diameter and 2 inches in length. Said rods of dough are deep-fat fried in hot oil at 375° F. for 5 minutes and are ready to eat.

In order to prepare french fries for a fry-freeze-microwave cycle, the process described immediately above is repeated except that the frying time of said dough rods is reduced to 4 minutes. The resulting fried rods are then frozen until final preparation is desired, at which time they are subjected to microwave reheating for 1 minute.

What is claimed is:

1. An improved potato based dough comprising:
    (a) 20% to 50% potato component based on dried potato weight, wherein said potato component has been adjusted to a reducing sugar content of from 0% to about 5%; an iodine index of from about 0.1 to about 6; and a lipid content defined by the relationship $Y=AX^{0.40}$, where Y is the lipid content of the dough in percent by weight of dehydrated potatoes, A has a value less than or equal to 2.70, and X is the dehydrated potato iodine index which ranges from about 0.01 to about 6; and
    (b) 25% to 55% water; wherein said improvement comprises the including in said dough of from about 3% to about 20% of a fibrous cellulosic material, said cellulosic material having a water absorbency of between about 2 g water/g fiber and 25 g water/g fiber and having a pectin content of at least about 15%, said cellulosic material being derived from citrus whole peel, citrus albedo, citrus juice vesicle solids, citrus rag, dried citrus pulp, sugar beet pulp, apples, or mixtures thereof.

2. A dough according to claim 1 wherein the fibrous cellulosic material has a pectin content of from about 15% to about 60%.

3. A dough according to claim 2 wherein the fibrous cellulosic material therein constitutes from about 3% to about 9% of the dry weight of the dough.

4. A dough according to claim 3 wherein said pectinated fibrous material has less than about 30% of the pectin in the form of a divalent metal salt.

5. A dough according to claim 4 wherein said pectinated fibrous cellulosic material has a degree of esterification of less than about 20%.

6. A dough according to claim 5 wherein the fibrous cellulosic material is derived from citrus whole peel.

7. A dough according to claim 5 wherein the fibrous cellulosic material is derived from sugar beet pulp.

8. A dough according to claim 5 wherein the fibrous cellulosic material is derived from citrus albedo.

9. A dough according to claim 7 wherein the fibrous cellulosic material constitutes 6% of the dry weight of the dough.

10. An improved potato based dough comprising:
    (a) 20% to 50% potato component based on dried potato weight, wherein said potato component has been adjusted to a reducing sugar content of from 0% to about 5%; an iodine index of from about 0.01 to about 6; and a lipid content defined by the relationship $Y=AX^{0.40}$, where Y is the lipid content of the dough in percent by weight of dehydrated potatoes, A has a value less than or equal to 2.70, and X is the dehydrated potato iodine index which ranges from about 0.01 to about 6; and
    (b) 25% to 55% water; wherein said improvement comprises the including in said dough of from about 3% to about 20% of a fibrous cellulosic material, said cellulosic material having a water absorbency of between about 2 g water/g fiber and 25 g water/g fiber, wherein the fibrous cellulosic material is a mixture of a water-soluble fibrous component and a water-insoluble fibrous component.

11. A dough according to claim 10 wherein the fibrous cellulosic material constitutes from about 3% to about 20% of the dry weight of the dough.

12. A dough according to claim 11 wherein the fibrous cellulosic material consists essentially of from about 0.5% to about 25% of the water-soluble fibrous component, the remainder consisting essentially of the water-insoluble fibrous component.

13. A dough according to claim 12 wherein the fibrous cellulosic material comprises from about 6% to about 12% of the dry weight of the dough.

14. A dough according to claim 13 wherein the water-soluble fibrous component is selected from the group consisting of xanthan, carboxy-methyl cellulose, carageenan, guar, pectin, tragacanth gum, and locust bean gum, and mixtures thereof.

15. A dough according to claim 14 wherein the water-insoluble fibrous component is a natural fiber containing less than 1% of water-soluble fiber.

16. A dough according to claim 15 wherein the water-insoluble fibrous component is selected from the group consisting of oat fiber, pea fiber, soy fiber, oat bran, rice bran, and mixtures thereof.

17. A dough according to claim 16 wherein the water-soluble fibrous component is dry mixed with the water-insoluble fibrous component.

18. A dough according to claim 16 wherein the water-soluble fibrous component is prehydrated with all or part of the water of the dough mixture before mixing with the water-insoluble fibrous component.

19. A dough according to claim 1 wherein said dough has a water content of from about 35% to about 45% by weight.

20. A dough according to claim 1 wherein said dough has a reducing sugar content of from about 0.4% to about 2% by weight.

21. A french-fried potato product, made from the dough of claim 1.

22. A chip-type product, made from the dough of claim 1.

* * * * *

UNITED STATES PATENT AND TRADEMARK OFFICE
CERTIFICATE OF CORRECTION

PATENT NO. : 4,876,102

DATED : Oct. 24, 1989

INVENTOR(S) : Robert D. Feeney, Robert L. Prosise, Joseph McGrady, Raymond L. Niehoff It is certified that error appears in the above-identified patent and that said Letters Patent is hereby corrected as shown below:

Col. 6, line 55: "materials" should read --material--

Col. 8, line 30: "than" should read --then--

Col. 14, line 62: "conventional" should read --Conventional--

Col. 17, line 60: "0.1" should read --.01--.

Col. 18, line 27: "7" should read --5--

Signed and Sealed this

Twenty-second Day of January, 1991

Attest:

HARRY F. MANBECK, JR.

Attesting Officer

Commissioner of Patents and Trademarks